(12) United States Patent
Pietruska et al.

(10) Patent No.: US 11,598,648 B2
(45) Date of Patent: Mar. 7, 2023

(54) METHOD AND SYSTEM FOR DETECTING A LANE

(71) Applicant: Bayerische Motoren Werke Aktiengesellschaft, Munich (DE)

(72) Inventors: Christoph Pietruska, Munich (DE); Jan-Ullrich Schamburek, Munich (DE); Robert Siegl, Mering (DE); Michal Siwak, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 198 days.

(21) Appl. No.: 17/044,350

(22) PCT Filed: May 10, 2019

(86) PCT No.: PCT/EP2019/062084
§ 371 (c)(1),
(2) Date: Oct. 1, 2020

(87) PCT Pub. No.: WO2020/020502
PCT Pub. Date: Jan. 30, 2020

(65) Prior Publication Data
US 2021/0094566 A1 Apr. 1, 2021

(30) Foreign Application Priority Data
Jul. 27, 2018 (DE) ..................... 10 2018 212 555.4

(51) Int. Cl.
*B60W 30/12* (2020.01)
*G01C 21/00* (2006.01)
(Continued)

(52) U.S. Cl.
CPC ... *G01C 21/3848* (2020.08); *B60W 30/18163* (2013.01); *B60W 40/06* (2013.01);
(Continued)

(58) Field of Classification Search
CPC ........ B60W 60/001; B60W 30/18163; B60W 2556/50; B60W 2552/53; B60W 2555/60;
(Continued)

(56) References Cited

U.S. PATENT DOCUMENTS 8,498,782 B2   7/2013 Roh et al.
9,535,423 B1 * 1/2017 Debreczeni ............ G06V 20/58
(Continued)

FOREIGN PATENT DOCUMENTS

DE   10 2013 003 216 A1   9/2013
DE   10 2010 062 129 A1   1/2014
(Continued)

OTHER PUBLICATIONS

International Search Report (PCT/ISA/210) issued in PCT Application No. PCT/EP2019/062084 dated Aug. 22, 2019 with English translation (five pages).

(Continued)

*Primary Examiner* — Peter D Nolan
*Assistant Examiner* — Wae L Louie
(74) *Attorney, Agent, or Firm* — Crowell & Moring LLP (57) ABSTRACT

A method detects a lane for a transverse guidance of a vehicle. The transverse guidance of the vehicle is based on a roadway model. The method has the steps of ascertaining one or more features which are suitable for influencing the detection of the lane; detecting a lane on the basis of a sensor system of the vehicle; and ascertaining the roadway model on the basis of the detected lane and the ascertained one or more features. The method optionally has the steps of additionally receiving navigation data and transversely guiding the vehicle on the basis of the ascertained roadway model.

14 Claims, 5 Drawing Sheets

(51) Int. Cl.
*B60W 60/00* (2020.01)
*B60W 30/18* (2012.01)
*B60W 40/06* (2012.01)
*G01C 21/34* (2006.01)
*G01C 21/36* (2006.01)
*G06V 20/58* (2022.01)
*G06V 20/56* (2022.01)

(52) U.S. Cl.
CPC ....... *B60W 60/001* (2020.02); *G01C 21/3453* (2013.01); *G01C 21/3691* (2013.01); *G01C 21/3819* (2020.08); *G01C 21/3889* (2020.08); *G06V 20/582* (2022.01); *G06V 20/588* (2022.01); *B60W 2420/42* (2013.01); *B60W 2552/53* (2020.02); *B60W 2555/60* (2020.02); *B60W 2556/50* (2020.02)

(58) Field of Classification Search
CPC ............ G01C 21/3889; G01C 21/3453; G01C 21/3691; G06V 20/582; G06V 20/588
See application file for complete search history.

(56) References Cited

U.S. PATENT DOCUMENTS

| | | | | |
|---|---|---|---|---|
| 10,776,634 | B2* | 9/2020 | Meis | G08G 1/167 |
| 11,500,387 | B2* | 11/2022 | Sun | G06F 9/00 |
| 2006/0227041 | A1* | 10/2006 | Okamoto | G06T 7/85 |
| | | | | 342/55 |
| 2011/0010021 | A1 | 1/2011 | Kobayashi | |
| 2014/0032108 | A1 | 1/2014 | Zeng et al. | |
| 2015/0103159 | A1* | 4/2015 | Shashua | G06V 20/58 |
| | | | | 348/118 |
| 2015/0153735 | A1* | 6/2015 | Clarke | B62D 15/025 |
| | | | | 701/301 |
| 2015/0332114 | A1* | 11/2015 | Springer | G06V 20/588 |
| | | | | 348/148 |
| 2018/0173970 | A1* | 6/2018 | Bayer | G06K 9/629 |
| 2018/0194286 | A1* | 7/2018 | Stein | B60W 10/22 |
| 2019/0266418 | A1* | 8/2019 | Xu | G05D 1/0221 |
| 2019/0266419 | A1* | 8/2019 | Schack | G05D 1/0246 |
| 2020/0050195 | A1* | 2/2020 | Gross | G05D 1/0242 |
| 2020/0167576 | A1* | 5/2020 | Gonzalez | B60W 30/165 |
| 2020/0207353 | A1* | 7/2020 | Chen | B60W 30/18163 |
| 2020/0331476 | A1* | 10/2020 | Chen | G05D 1/0088 |
| 2021/0094566 | A1* | 4/2021 | Pietruska | G01C 21/32 |
| 2021/0213945 | A1* | 7/2021 | Schamburek | B60W 30/12 |
| 2021/0213951 | A1* | 7/2021 | Dobi | G08G 1/0112 |
| 2022/0176976 | A1* | 6/2022 | Fermon | B60W 50/0098 |

FOREIGN PATENT DOCUMENTS

| | | |
|---|---|---|
| DE | 10 2013 105 046 A1 | 1/2014 |
| DE | 10 2013 220 487 A1 | 4/2015 |
| DE | 10 2017 005 921 A1 | 12/2017 |
| JP | 2017-159723 A | 9/2017 |

OTHER PUBLICATIONS

German-language Written Opinion (PCT/ISA/237) issued in PCT Application No. PCT/EP2019/062084 dated Aug. 22, 2019 (seven pages).

German-language Office Action issued in German Application No. 10 2018 212 555.4 dated Apr. 15, 2019 (six pages).

"Forschung kompakt", German Federal Highway Research Institute, 2012, Issue Nov. 2012, BASt, with English abstract (two pages).

* cited by examiner

METHOD AND SYSTEM FOR DETECTING A LANE

BACKGROUND AND SUMMARY OF THE INVENTION

The disclosure relates to systems and methods for lane detection. The disclosure relates in particular to systems and methods for lane detection for the purpose of transverse guidance of automated vehicles.

Lane keeping systems and methods for vehicles, in particular automated vehicles, that use optical sensors, such as for example cameras, to detect lanes on the basis of road markings and structural elements are known in the prior art. The systems and methods are geared to output a warning or even to actively intervene in the steering if the vehicle threatens to leave a lane currently being used. The term vehicle covers automobiles, trucks, buses, motor caravans, motorcycles and the like that are used to convey people, goods, etc. In particular, the term covers motor vehicles for conveying people.

The term "automated driving" can be understood within the context of the document to mean driving with automated longitudinal or transverse guidance or autonomous driving with automated longitudinal and transverse guidance. The automated driving can be for example driving for a relatively long time on the freeway or driving for a limited time during parking or maneuvering. The term "automated driving" covers automated driving with an arbitrary level of automation. Exemplary levels of automation are assisted, semiautomated, highly automated or fully automated driving. These levels of automation have been defined by the German Federal Highway Research Institute (BASt) (see BASt publication "Forschung kompakt", issue November 2012). Assisted driving involves the driver continually performing the longitudinal or transverse guidance while the system undertakes the respective other function within certain boundaries. Semiautomated driving (SAD) involves the system undertaking the longitudinal and transverse guidance for a certain period of time and/or in specific situations, with the driver needing to continually monitor the system as in the case of assisted driving. Highly automated driving (HAD) involves the system undertaking the longitudinal and transverse guidance for a certain period of time without the driver needing to continually monitor the system; however, the driver must be capable of undertaking the vehicle guidance within a certain time. In the case of fully automated driving (FAD), the system can manage the driving automatically in all situations for a specific application; this application no longer requires a driver. The aforementioned levels of automation correspond to SAE levels 1 to 4 of the SAE (Society of Automotive Engineering) J3016 standard. By way of example, highly automated driving (HAD) corresponds to level 3 of the SAE J3016 standard. Furthermore, the SAE J3016 also provides SAE level 5 as the highest level of automation, which is not contained in the definition by the BASt. SAE level 5 corresponds to driverless driving, wherein the system can automatically manage all situations like a human driver during the entire journey; a driver is generally no longer required.

Driver assistance functions typically require information about the current profile of usable lanes (e.g. the vehicle's own lane, or lanes situated to the left or right thereof) in order to allow transverse guidance (also "lane keeping") of the vehicle.

Under certain circumstances, for example in poor visibility or weather conditions, when road markings intersect, are completely or partially missing or poorly visible, or in the case of special routes (e.g. hill, valley, tight curves), problems with lane detection can arise, with corresponding consequences in particular for the transverse guidance of a vehicle.

Typical examples of such cases are entrances and exits or road widenings and narrowings, in which there are sometimes additional lane markings and these lead away from the actual lane (also "ego lane"). Depending on the quality of the detected lane markings, they can lead to a different profile for the created route guidance curve. To counter such problems, navigation data, among other things, are used to interpolate the continuing profile of the road.

DE 10 2013 220 487 A1 discloses for example a lane detection system having an optical lane detector and a GNSS-based position detector (GNSS—Global Navigation Satellite System). The GNSS position detector is designed to determine information pertaining to a lane profile from digital map data on the basis of a detected position, a known position detection accuracy and known accuracy limits of the digital map data and to convey data pertaining to the determined lane profile to the optical lane detector. The optical lane detector is in turn designed to take into consideration the data pertaining to the determined lane profile from the position detector during lane detection. The system is substantially geared to take very accurate map material and corresponding position statements as a basis for determining an interpolated lane profile and to convey the latter to the optical lane detector so that the latter can perform lane detection for the entire route section even in poor visibility, with only sometimes detected road markings.

U.S. Pat. No. 8,498,782 B2 also discloses a lane keeping system that also evaluates information from a GNSS in addition to the information from optical and distance measurement sensors. The GNSS information in this instance is used to determine an approximate position of the vehicle on a road. The precise vehicle position on the road is then determined on the basis of further information from the optical sensors and distance measurement sensors. In other words, the position is first determined approximately and then refined further.

DE 10 2013 003 216 A1 discloses a method for determining a lane for the purpose of controlling the steering of a vehicle with automated control. One lane is determined using a first system on the basis of captured environmental data and another lane is determined using a second system. Starting from a current position, a digital map and data obtained by odometry are taken as a basis for rendering the second lane determinable independently of the first lane. Process data calculated by the first and second systems for the purpose of determining the lanes are continually matched to one another, and failure of one of the two systems results in the lane being determined solely on the basis of the remaining, operational system. According to the method described, a matching means that the data determined in the past are taken as a basis for making a statement about the quality of the currently determined data of the two systems, and this statement is taken as a basis for determining new data, optimized in respect of accuracy, from the current data, the new data being taken by both systems as a basis for further calculation. While both systems are operational, the process data are matched, which means that signals output from both systems by a lane controller for the purpose of controlling actuators are substantially concordant. The matching ensures that both systems calculate a concordant specified lane requirement before one of the systems fails. If one of the system fails, lane planning can be continued by one of the two systems without sudden changes in the specified requirement. The orientation of the method in this instance is continuous matching of the two systems, so that steering control can continue without sudden changes in the specified requirement in the event of failure of one of the systems.

Known systems and methods can have one or more of the following disadvantages. Some systems are sometimes or completely reliant on the visibility of lane markings or of features characteristic of lanes. The optical sensors can reliably detect lane markings only if they are also visible to the human eye. In particular lane soiling, worn lane markings, poor light conditions and weather conditions can therefore lead to the lane markings not being able to be detected reliably and the underlying system or method being able to be operated only with limitations or not at all in some situations.

A disadvantage of GNSS-assisted lane keeping systems is, among other things, that GNSS-based position determination is often too inaccurate to provide sufficiently precise position determination for a lane keeping system. The GNSS accuracy of navigation systems currently available in mass produced vehicles is typically not sufficient for a lane keeping system, which means that systems and methods based thereon can assist optical systems only to a limited extent. This also has the associated problem that mass produced navigation systems are frequently based on map data that have too low an accuracy for a lane keeping system. In total, the position of the vehicle within a lane often cannot be determined sufficiently accurately on the basis of the GNSS data; this would require greater accuracy from both the position determination and the map data, for example with a resolution in the region of a few centimeters.

On the basis of the aforementioned limitations and shortcomings, erroneous lane detection can therefore occur in specific situations in particular, for example if erroneously detected or incorrect lane markings are used for the road model and the lane detection. This can happen, even with good visibility, in particular in the region of entrances and exits on freeways, widenings or narrowings (i.e. changes in the number of available lanes), at junctions having numerous road markings for different directions of travel, at underpasses or overpasses, in the case of hills or valleys and in the region of roadworks. In particular roadworks can be problematic in this regard, on account of changed traffic routing and other factors, which often occur in the region of roadworks. Typically, changed road markings in addition to already existing markings are present in the region of roadworks, a distinction usually being able to be drawn by color (e.g. yellow as opposed to white) in this instance. Furthermore, changed signage, often in addition to sometimes temporarily disguised existing signage, is used in the region of roadworks. Special arrangements need to be observed in this regard (e.g. changed lane widths, route prohibitions, shortened exits and entrances, exits and entrances for special vehicles) and/or soiling must be expected more frequently.

As a result, unwanted or incorrect control impulses can be triggered, in particular if a vehicle cannot perform reliable lane detection and/or positioning, or if the lane was at times determined only inaccurately and then a correction needs to be made within a relatively short distance. Such control impulses can lead to comparatively jerky or unclear changes of direction, in particular to what is known as "missteering". Ultimately, this can lead to dangerous driving situations and/or to situations that have a negative influence on an effective or perceived driving behavior.

It is an object of the present disclosure to provide systems and methods for lane detection that avoid one or more of the aforementioned disadvantages and/or allow one or more of the described advantages.

This object is achieved by the subject matter of the independent claims. Advantageous refinements are specified in the subclaims.

In a first aspect according to embodiments of the present disclosure, a method for detecting a lane for transverse guidance of a vehicle is specified, the transverse guidance of the vehicle being on the basis of a road model. The method comprises determining one or more features, wherein the one or more features are suitable for influencing a detection of the lane; detecting a lane on the basis of a sensor system of the vehicle; determining the road model on the basis of the detected lane and the determined one or more features.

In a second aspect according to aspect 1, the method also comprises receiving navigation data. The one or more features are determined on the basis of the navigation data.

In a third aspect according to one of the preceding aspects, the navigation data comprise one or more of the following data: map data, in particular Advanced Driver Assistance Systems (ADAS) data; data on the basis of collective driving behavior of a multiplicity of vehicles; and data on the basis of a detection of road signs, in particular an optical detection of road signs.

In a fourth aspect according to one of the preceding aspects, the method also comprises determining a weighting of one or more elements of the lane that are detected by the sensor system of the vehicle. The road model is also determined on the basis of the determined weighting.

In a fifth aspect according to one of the preceding aspects, if the one or more features indicate the presence of an entry or exit on a road section being used by the vehicle, determining the road model comprises: weighting elements present on a side of the lane that is remote from the entry or exit using a first factor; and weighting elements present on a side of the lane that faces the entry or exit using a second factor; wherein the first factor indicates a higher weighting than the second factor.

In a sixth aspect according to one of the preceding aspects, if the one or more features indicate the presence of a widening or narrowing on a road section being used by the vehicle, and the widening or narrowing relates to a lane that is beginning or ending, determining the road model comprises: weighting elements present on a side of the lane that is remote from the beginning or ending lane using a first factor; and weighting elements present on a side of the lane that faces the beginning or ending lane using a second factor; wherein the first factor indicates a higher weighting than the second factor.

In a seventh aspect according to either of the two preceding aspects, the first and second factors are configured to optionally indicate a weighting in the range from 0% to 100%, preferably wherein the first factor indicates a weighting of 100% and wherein the second factor indicates a weighting of 0%.

In an eighth aspect according to one of the preceding aspects, the method also comprises transversely guiding the vehicle on the basis of the determined road model.

In a ninth aspect according to embodiments of the present disclosure, a system for detecting a lane for transverse guidance of a vehicle is specified. The system comprises a control unit configured to carry out the method according to the embodiments described here.

In a tenth aspect according to embodiments of the present disclosure, a vehicle is specified. The vehicle can comprise the system according to the embodiments described here. Preferably, the vehicle comprises means for semiautonomous or autonomous control of the vehicle, wherein the means for semiautonomous or autonomous control of the vehicle are optionally configured to carry out the transverse guidance of the vehicle.

According to embodiments of the present disclosure, the lane detection in particular in the region of roadworks, at widenings/narrowings and at entrances/exits is improved by virtue of an intelligent fusion of additional navigation data, for example map data, detecting the respective situation in advance already and then, depending on the situation, only specific information or sensor data being used for the lane detection, or a special weighting of such information or data being performed in order to produce a robust model of the road.

In particular, according to embodiments of the present disclosure, missteering is effectively prevented and potentially dangerous situations are effectually avoided. Furthermore, the objective driving behavior and the subjective feeling of safety of vehicle occupants are improved.

BRIEF DESCRIPTION OF THE DRAWINGS

Exemplary embodiments of the disclosure are depicted in the figures and are described in more detail below. The same reference signs are used hereinbelow for elements that are the same and that have the same effect, unless indicated otherwise.

DETAILED DESCRIPTION OF THE DRAWINGS

Figure 1:
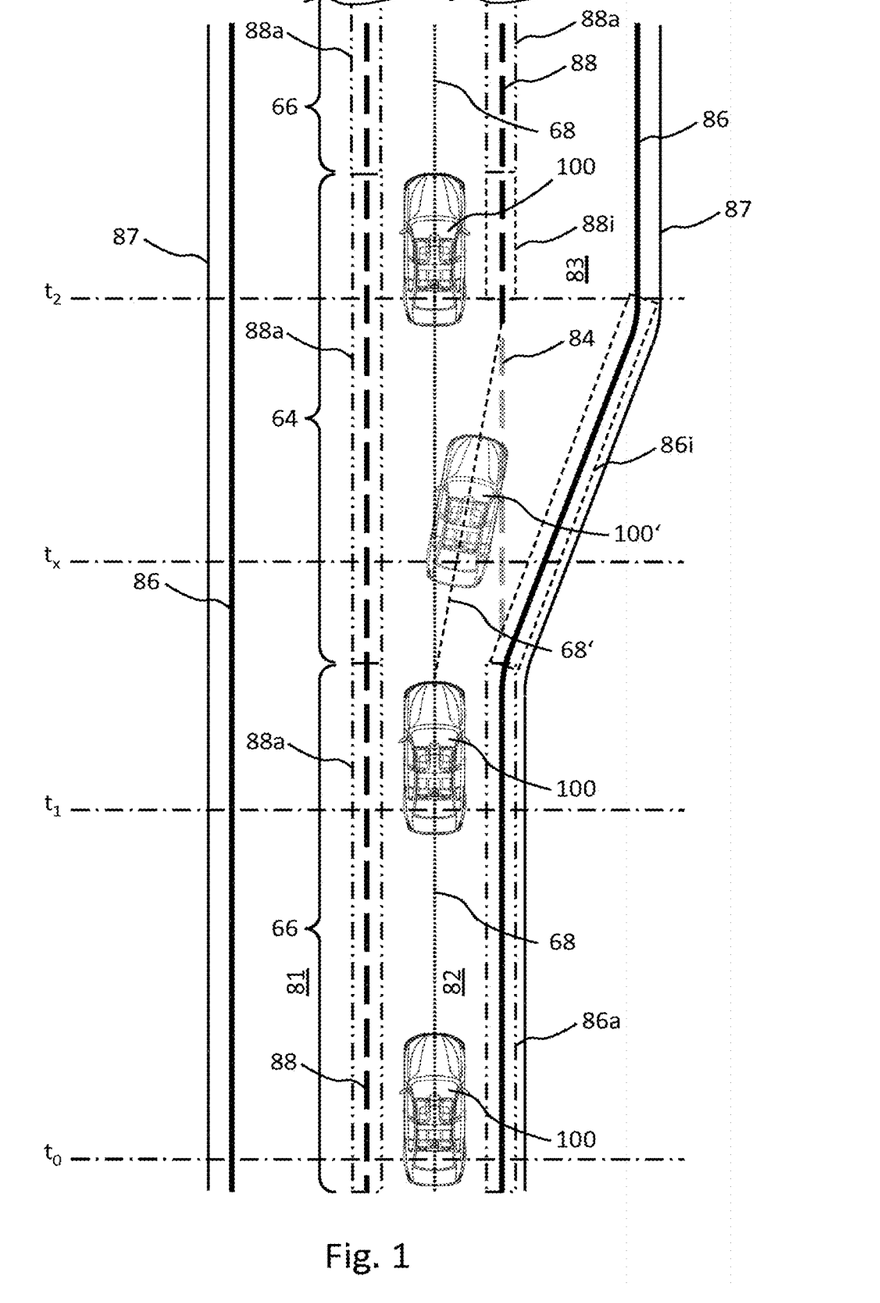
FIG. 1 shows a schematic plan view of a first driving situation of a vehicle according to embodiments of the present disclosure.

FIG. 1 shows a schematic plan view of a first driving situation of a vehicle 100 according to embodiments of the present disclosure. In this first exemplary driving situation, the vehicle 100 is on a road having two lanes 81, 82 in the direction of travel (e.g. freeway or road with structurally separate carriageways).

Normally, the transverse guidance requires information pertaining to the road model of the vehicle's own lane (in this instance lane 82) and, if present, of the left (in this instance lane 81) and right (not present) lanes. The road model is regularly determined substantially from the detected lane markings or structural features, the determined lane center profile and the information from the navigation data. In order to avoid an incorrect road model, the road model and the determination of the route guidance curve need to be adapted in the situations described as problematic.

In the situation shown, the vehicle 100 is in the lane 82 and, beginning at times t0, t1 and t2, passes through the sections 66, 64 and 66. Vehicle 100 detects road marking 88, which separates lanes 81 and 82 from one another, and road boundaries 86, which bound the usable road area at the sides.

The usable area can additionally be bounded by the shoulder or a grass verge 87, the vehicle 100 normally not using the area between the road boundary 86 and the boundary 87.

In the section 64, a third lane 83 is supposedly added to the lanes 81 and 82, this third lane likewise being separated from the lane 82 by a road marking 88. This third lane 83 is merely an exit, however, and is not an additional lane following the continuing road profile. Road marking 84 denotes an exemplary road marking that exhibits signs of wear and can therefore be detected by the vehicle 100 only with difficulty or not at all. In some cases, a road marking is missing in the area of the road marking 84 completely, the effect on detection being similar.

In the exemplary first driving situation shown, an additional lane 83 is supposedly added on the right-hand side of the vehicle 100 to the lane 82 being used by the vehicle 100. By default, the vehicle 100 detects its own lane 82 on the basis of the detection of the road marking 88 in the area 88*a* (see section 66 at the bottom of FIG. 1) and on the basis of the detection of the road boundary 86 in the area 86*a* (likewise see section 66 at the bottom of FIG. 1) as boundaries for its own lane 82. On the basis of this detection, the vehicle 100 determines the road model and a route guidance curve (or line) 68. The latter runs, according to schedule, substantially centrally in the lane 82.

At the transition between the area 66 and the area 64 (in the "direction of travel" from bottom to top in FIG. 1), it is possible, as already described, for the road boundary 86 to be detected as the right-hand boundary of the vehicle's own lane 82, for example on the basis of a difficult-to-detect or absent road marking 84. In this regard, it should be noted that in Germany the road markings at entrances and exits are continuous for the most part, whereas in other countries (e.g. USA) it is customary for the road marking first to disappear (e.g. in the area of the road marking 84) and to begin again only after a certain distance. Moreover, the road marking may also be difficult to detect as a result of soiling or wear. In such situations, a conventional transverse guidance will attempt to find a right-hand lane boundary, and will detect the road boundary 86 (in this instance in the area 86*i*, for example) as such, for example.

As a result of the detection of the road boundary 86 as the right-hand edge of the lane 82, the vehicle 100 then determines a route guidance curve 68' that differs from the route guidance curve 68 that is actually correct. On the basis of the route guidance curve 68', which, as depicted in FIG. 1, leads off substantially to the right from the actually correct route guidance curve 68 within a very short distance, the transverse guidance of the vehicle 100 induces a steering movement in the direction of the exit or in the direction of the supposed lane 83, for example depicted by the vehicle 100'. This process is generally referred to as "missteering", where the vehicle 100' incorrectly changes lane or at least begins to change lane (see time tx). On the basis of the detected route guidance curve 68', the longitudinal guidance can also induce a braking moment, or further guidance or assistance functions can be triggered or influenced. As already described, this entails a few disadvantages.

According to embodiments of the present disclosure, the driving behavior depicted by vehicle 100' is effectually prevented.

Navigation data can be used to detect a series of road features, in the present case for example that there is an exit present. Further road features include for example road widenings or narrowings, junctions, forks in the road and mergings, overpasses and underpasses, and hills and valleys.

On the basis of the detected road features, specific situations can then be anticipated and the determination of the road model can be adapted.

Navigation data include for example map data available in the vehicle or online (e.g. Advanced Driver Assistance Systems (ADAS) data), data from backend structures (e.g. backend server), data on the basis of collective driving behavior (e.g. evaluations of GPS data from other vehicles) or data captured by the vehicle (e.g. detection of road signs).

In the case depicted in FIG. 1, for example map data (e.g. ADAS) are taken as a basis for determining the presence of an exit, and the road model is adapted as follows. In a predetermined area 64, which substantially covers the area of the exit, possibly including transitional areas before and after the exit (in some embodiments in the range from 50 m to 300 m), the determination of the route guidance curve 68 is adapted by virtue of detected road features being weighted in an altered manner. First, or according to schedule, the route guidance curve 68 in the area 66 (see bottom of FIG. 1) is determined on the basis of the left-hand road marking 88 (see area 88a) and the right-hand road boundary 86 (see area 86a). In the area 64 that follows in the direction of travel (see middle of FIG. 1), the road model is then oriented substantially or exclusively to the left-hand road marking 88 (see area 88a), whereas the potentially problematic right-hand road boundary 86 (see area 86i) and/or the road marking 84 are considered only secondarily or not at all. An exemplary weighting can prioritize exclusively the left-hand road marking 88 in the area 88a, which marking would then be assigned a weighting of 100%, and can completely mask out the right-hand road boundary 86, this corresponding to a weighting of 0%. Depending on the situation, other weighting models or other weightings that allow a desired route guidance curve 68 are possible. Additionally, the determined route guidance curve can be processed further, for example involving a smoothing or a plausibility check, in order to obtain an optimized profile of the route guidance curve and/or to filter out erroneous points.

When considered with respect to time, the following control profile is substantially obtained. At time t0, a scheduled transverse guidance without particular limitations or adaptations takes place. At time t1, navigation data (see above) are taken as a basis for generating an event that indicates the presence of an exit at a specific distance (e.g. in the range up to 500 m, preferably in the range up to 300 m). At time t1, or from time t1 onward, the road model or the determination of the route guidance curve 68 can then be intermittently adapted as described. The feature causing the event (in this instance: exit) can have an extent as well, so that a second event, occurring later in the timing, that indicates the end of the presence can be generated at time t1 already. Optionally, the second event can also be generated at a later time (e.g. time t2 or else later, depending on the extent of the feature). The second event can then (for example at time t2) prompt the scheduled transverse guidance without limitations or adaptations to be resumed.

In some embodiments, rule-based adaptation of the road model or of the determination of the route guidance curve can take place. In the present case, the presence of an exit area can lead, in a rule-based manner, to only those elements of the road markings or road boundaries that are remote from the exit being used to determine the route guidance curve (see previous paragraph).

The presence of an entry can be handled in substantially the same way as the described case of an exit, which means that the concepts and methods described are applicable analogously.

Figure 2:
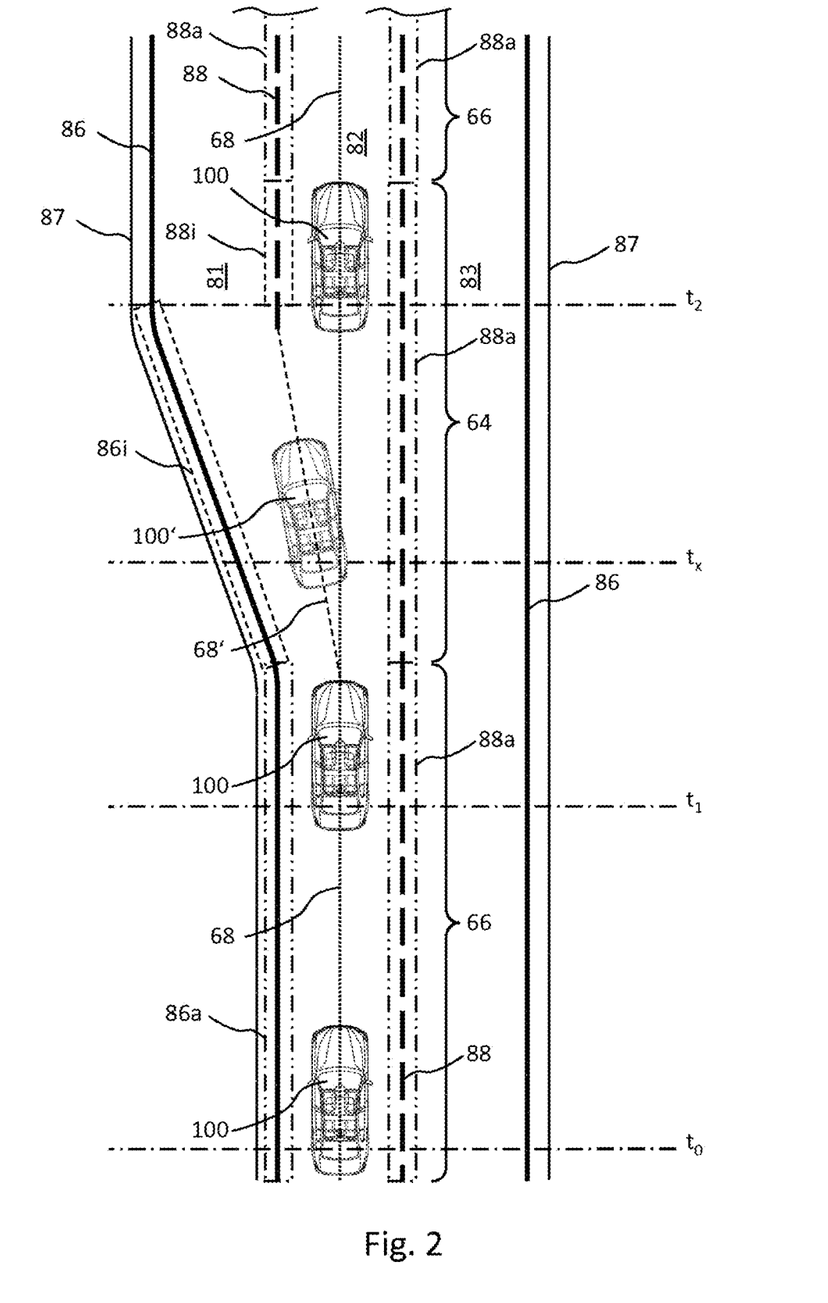
FIG. 2 shows a schematic plan view of a second driving situation of a vehicle according to embodiments of the present disclosure.

FIG. 2 shows a schematic plan view of a second driving situation of a vehicle 100 according to embodiments of the present disclosure. In this second exemplary driving situation, the vehicle 100 is on a road having initially two lanes 82, 83 in the direction of travel (e.g. freeway or road with structurally separate carriageways), which then expand to three lanes 81, 82, 83.

As in the first exemplary driving situation, the transverse guidance requires information pertaining to the road model of the vehicle's own lane (in this instance lane 82) and, if present, of the left (later on lane 81) and right (in this instance lane 83) lanes. The road model is regularly determined substantially from the detected lane markings or structural features, the determined lane center profile and the information from the navigation data. In order to avoid an incorrect road model, the road model and the determination of the route guidance curve need to be adapted in this driving situation too.

Widenings/narrowings behave in a similar manner to exits and entries. One difference, however, can be that for example in the case of a widening from two to three lanes there is no definition of what side of the road an additional lane appears on. In order to determine which road markings or whether one side of the lane, and if so which one, need(s) to be prioritized, heuristics can be used in order to rate the quality of the lane markings and to compare them with one another. To this end, different influencing factors can be considered, for example the stability of a marking (e.g. similarity to previously observed markings taking into consideration the odometry data), parallelism with other markings, type of marking (e.g. white, yellow) or the like. Each quality feature can be assigned a weight and, on the basis of the heuristics used, the marking that has a predetermined weight (e.g. the highest weight) or exceeds this weight (e.g. is greater than a minimum weight) can be selected.

In the situation shown, the vehicle 100 is in the lane 82 and, beginning at times t0, t1 and t2, passes through the sections 66, 64 and 66. Vehicle 100 detects road marking 88, which separates lanes 82 and 83 from one another, and road boundaries 86, which bound the usable road area at the sides.

In the section 64, a third lane 81 is added to the lanes 82 and 83, this third lane, at least later on, likewise being separated from the lane 82 by a road marking 88. This third lane 81 is, in contrast to the first driving situation, an additional lane that follows the continuing road profile. Furthermore, in contrast to the first driving situation, a road marking separating the lanes 81 and 82 is missing entirely over large parts of the section 64, which is why reliable detection of the left-hand lane boundary is not possible in this section.

In the exemplary second driving situation shown, an additional lane 81 is thus added on the left-hand side of the vehicle 100 to the lane 82 being used by the vehicle 100. By default, the vehicle 100 detects its own lane 82 on the basis of the detection of the road marking 88 in the area 88a (see section 66 at the bottom of FIG. 2) and on the basis of the detection of the road boundary 86 in the area 86a (likewise see section 66 at the bottom of FIG. 2) as boundaries for its own lane 82. On the basis of this detection, the vehicle 100 determines the road model and a route guidance curve (or line) 68. The latter runs, according to schedule, substantially centrally in the lane 82.

At the transition between the area 66 and the area 64 (in the "direction of travel" from bottom to top in FIG. 2), it is possible, as already described, for the road boundary 86 to be detected as the left-hand boundary of the vehicle's own lane 82, for example on the basis of a difficult-to-detect or, as shown in FIG. 2, absent road marking that would separate the appearing lane 81 from the lane 82.

As a result of the detection of the road boundary 86 as the left-hand edge of the lane 82, the vehicle 100 then determines a route guidance curve 68' that differs from the route guidance curve 68 that is actually correct, substantially analogously to the first driving situation already described. On the basis of the route guidance curve 68', which, as depicted in FIG. 2, leads off substantially to the left from the actually correct route guidance curve 68 within a very short distance, the transverse guidance of the vehicle 100 induces a steering movement in the direction of the lane 81, for example depicted by the vehicle 100'. Again, "missteering" can occur, where the vehicle 100' incorrectly changes lane or at least begins to change lane (see time tx). On the basis of the detected route guidance curve 68', the longitudinal guidance can also induce a braking moment, or further guidance or assistance functions can be triggered or influenced.

According to embodiments of the present disclosure, the driving behavior depicted by vehicle 100' is effectually prevented in the case of a widening of the road too.

In the case depicted in FIG. 2, once again for example map data (e.g. ADAS) are taken as a basis for determining the presence of a widening. Alternatively, this can also be achieved by detecting road signs announcing a widening of the road. Again, the road model is adapted, as described below.

In a predetermined area 64, which substantially covers the area of the widening, possibly including transitional areas before and after the widening, the determination of the route guidance curve 68 is adapted by virtue of detected road features being weighted in an altered manner. First, or according to schedule, the route guidance curve 68 in the area 66 (see bottom of FIG. 2) is determined on the basis of the right-hand road marking 88 (see area 88a) and the left-hand road boundary 86 (see area 86a). In the area 64 that follows in the direction of travel (see middle of FIG. 2), the road model is then oriented substantially or exclusively to the right-hand road marking 88 (see area 88a), whereas the potentially problematic left-hand road boundary 86 (see area 86i) is considered only secondarily or not at all. An exemplary weighting can prioritize exclusively the right-hand road marking 88 in the area 88a, which marking would then be assigned a weighting of 100%, and can completely mask out the left-hand road boundary 86, this corresponding to a weighting of 0%. Depending on the situation, other weighting models or other weightings that allow a desired route guidance curve 68 are possible. As already mentioned, the determined route guidance curve can additionally be processed further.

When considered with respect to time, the following control profile is substantially obtained. At time t0, a scheduled transverse guidance without particular limitations or adaptations takes place. At time t1, navigation data (see above) are taken as a basis for generating an event that indicates the presence of a widening at a specific distance (e.g. in the range up to 200 m, preferably in the range up to 50 m). At time t1, or from time t1 onward, the road model or the determination of the route guidance curve 68 can then be intermittently adapted as described, and subsequently, for example at time t2, the scheduled transverse guidance without limitations or adaptations can be resumed.

In some embodiments, rule-based adaptation of the road model or of the determination of the route guidance curve can take place. In the present case, the presence of a widening can lead, in a rule-based manner, to only those elements of the road markings or road boundaries that are remote from the widening being used to determine the route guidance curve.

In some embodiments of the present disclosure, the lane center profile can be ignored (weighting zero), the lane markings continuing to be weighted in the same way. The lane center profile (HPP) estimated on the basis of the signals from a camera, for example, is ideally situated centrally between two lane markings (e.g. 86, 88; cf. 68 in FIGS. 1, 2, 3). In the event of erroneous detection of the HPP (e.g. along 68'), the latter should be rejected accordingly.

Figure 3:
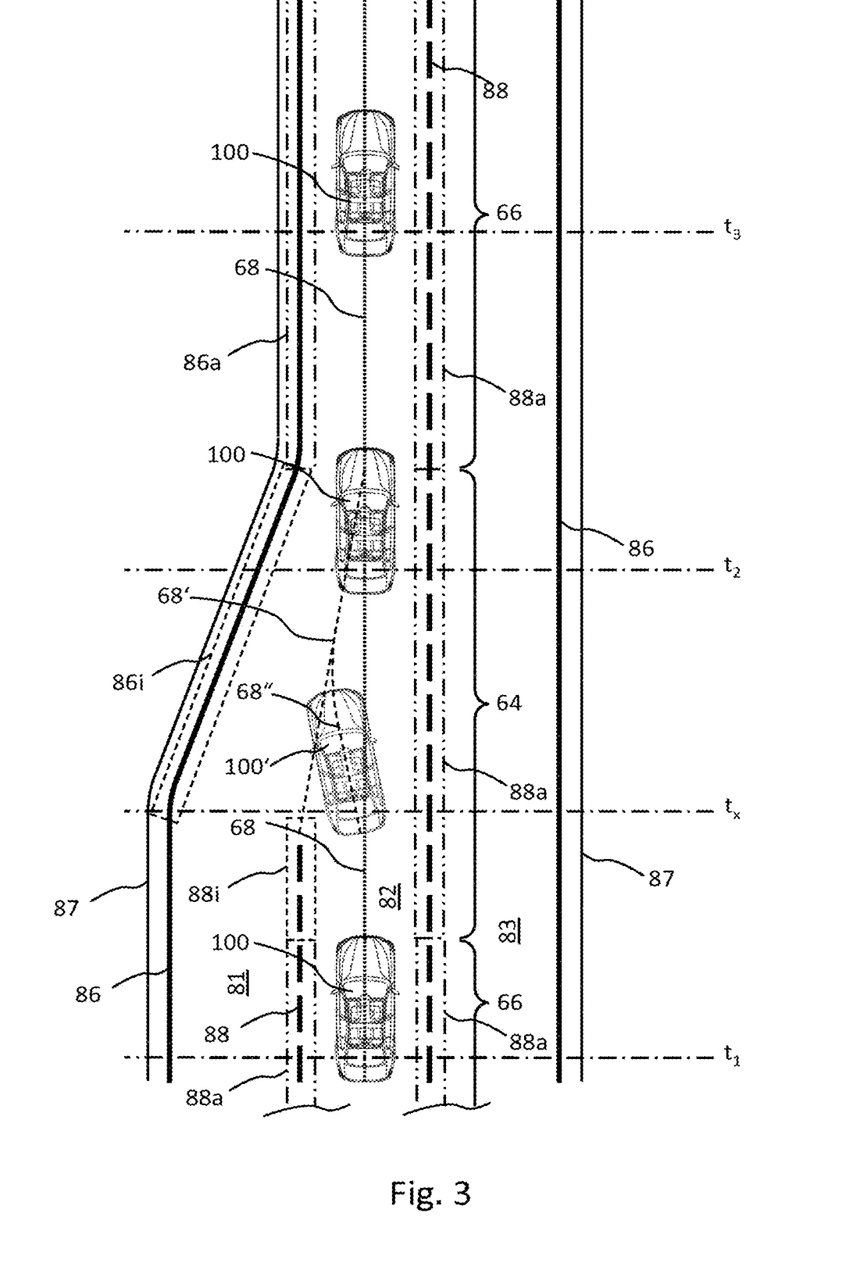
FIG. 3 shows a schematic plan view of a third driving situation of a vehicle according to embodiments of the present disclosure.

FIG. 3 shows a schematic plan view of a third driving situation of a vehicle 100 according to embodiments of the present disclosure. In this third exemplary driving situation, the vehicle 100 is on a road having initially three lanes 81, 82, 83 in the direction of travel (e.g. freeway or road with structurally separate carriageways), which then narrow to two lanes 82, 83.

As in the first and second exemplary driving situations, the transverse guidance requires information pertaining to the road model of the vehicle's own lane (in this instance lane 82) and, if present, of the left (initially lane 81) and right (in this instance lane 83) lanes. The road model is regularly determined substantially from the detected lane markings or structural features, the determined lane center profile and the information from the navigation data. In order to avoid an incorrect road model, the road model and the determination of the route guidance curve need to be adapted in this third driving situation too.

In the situation shown, the vehicle 100 is in the lane 82 and, beginning at times t0, t1 and t2, passes through the sections 66, 64 and 66. Vehicle 100 detects a left-hand road marking 88, which separates the lanes 81 and 82 from one another, and a right-hand road marking 88, which separates the lanes 82 and 83 from one another.

In the section 64, the lane 81, which had initially likewise been separated from the lane 82 by a road marking 88, ends. In contrast to the first driving situation, a road marking separating the lanes 81 and 82 is missing over large parts of the section 64 in the area in which the lane 81 ends, which is why reliable detection of the left-hand lane boundary is not possible in this section.

In the exemplary third driving situation shown, the lane 81 additionally present on the left-hand side of the lane 82 being used by the vehicle 100 thus ends. By default, the vehicle 100 detects its own lane 82 on the basis of the detection of the left-hand road marking 88 in the left-hand area 88a (see section 66 at the bottom of FIG. 3) and on the basis of the detection of the right-hand road marking 88 in the right-hand area 88a (likewise see section 66 at the bottom of FIG. 3) as boundaries for its own lane 82. On the basis of this detection, the vehicle 100 determines the road model and a route guidance curve (or line) 68. The latter runs, according to schedule, substantially centrally in the lane 82.

At the transition between the area 66 and the area 64 (in the "direction of travel" from bottom to top in FIG. 3), it is possible, as already described, for the road boundary 86 to be detected as the left-hand boundary of the vehicle's own lane 82, for example on the basis of a difficult-to-detect or, as shown in FIG. 3, absent road marking that would separate the ending lane 81 from the lane 82.

As a result of the detection of the road boundary 86 as the left-hand edge of the lane 82, the vehicle 100 then determines a route guidance curve 68' that differs from the route guidance curve 68 that is actually correct, substantially analogously to the first and second driving situations already described. On the basis of the route guidance curve 68', which, as depicted in FIG. 3, leads off substantially to the left from the actually correct route guidance curve 68 and then back again within a very short distance, the transverse guidance of the vehicle 100 induces a steering movement in the direction of the lane 81 and then back to the lane 82, for example depicted by the vehicle 100'. Again, "missteering" can occur, where the vehicle 100' incorrectly changes lane or at least begins to change lane (see time tx). To compound matters, the third driving situation additionally involves the missteering to the left needing to be corrected a short time later by steering back, which can result in a further change of load and possibly a rocking of the vehicle 100'. On the basis of the detected route guidance curve 68', the longitudinal guidance can also induce a braking moment, or further guidance or assistance functions can be triggered or influenced. Possibly in combination with the missteering and/or rocking of the vehicle 100', this can produce dangerous driving maneuvers.

According to embodiments of the present disclosure, the driving behavior depicted by vehicle 100' is effectually prevented in the case of a narrowing of the road too.

In the case depicted in FIG. 3, once again for example map data (e.g. ADAS) are taken as a basis for determining the presence of a narrowing. Alternatively, this can also be achieved by detecting road signs announcing a narrowing of the road or on the basis of collective vehicle movement data that perform a change of lane from the left-hand lane 81 to the middle lane 82 in the applicable area. Again, the road model is adapted, as described below.

In a predetermined area 64, which substantially covers the area of the narrowing, possibly including transitional areas before and after the narrowing, the determination of the route guidance curve 68 is adapted by virtue of detected road features being weighted in an altered manner. First, or according to schedule, the route guidance curve 68 in the area 66 (see bottom of FIG. 3) is determined on the basis of the left-hand road marking 88 (see left-hand area 88a) and the right-hand road marking 88 (see right-hand area 88a). In the area 64 that follows in the direction of travel (see middle of FIG. 3), the road model is then oriented substantially or exclusively to the right-hand road marking 88 (see area 88a), whereas the potentially problematic left-hand road boundary 86 (see area 86i) is considered only secondarily or not at all. An exemplary weighting can prioritize exclusively the right-hand road marking 88 in the area 88a, which marking would then be assigned a weighting of 100%, and can completely mask out the left-hand road boundary 86, this corresponding to a weighting of 0%. Depending on the situation, other weighting models or other weightings that allow a desired route guidance curve 68 are possible. As already mentioned, the determined route guidance curve can additionally be processed further.

When considered with respect to time, the following control profile is substantially obtained. At time t0, a scheduled transverse guidance without particular limitations or adaptations takes place. At time t1, navigation data (see above) are taken as a basis for generating an event that indicates the presence of a narrowing at a specific distance (e.g. in the range up to 200 m, preferably in the range up to 50 m). At time t1, or from time t1 onward, the road model or the determination of the route guidance curve 68 can then be intermittently adapted as described, and subsequently, for example at time t2, the scheduled transverse guidance without limitations or adaptations can be resumed.

In some embodiments, rule-based adaptation of the road model or of the determination of the route guidance curve can take place. In the present case, the presence of a narrowing can lead, in a rule-based manner, to only those elements of the road markings or road boundaries that are remote from the narrowing being used to determine the route guidance curve.

Figure 4:
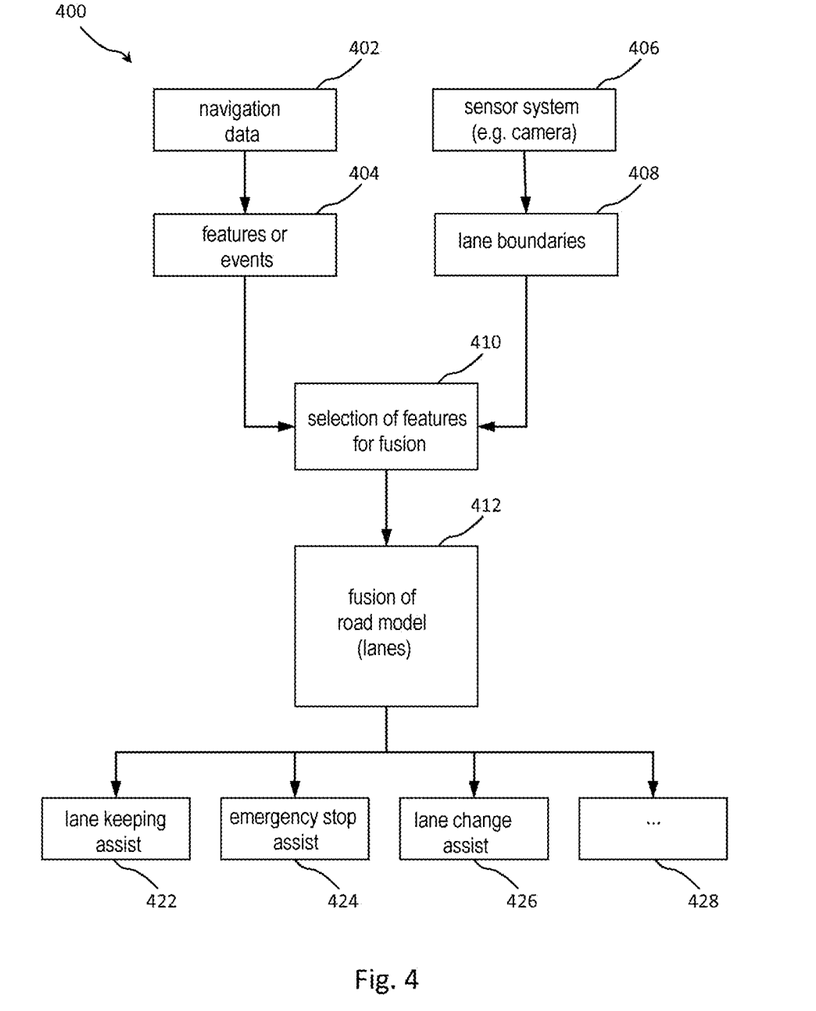
FIG. 4 shows a block diagram of a system according to embodiments of the present disclosure.

FIG. 4 shows a block diagram of a system 400 according to embodiments of the present disclosure. As described by way of example with reference to FIGS. 1 to 3, the system 400 takes navigation data 402 as a basis for generating one or more events 404 indicating particular driving situations. The sensor system 406 of the vehicle 100 is taken as a basis for determining elements 408, for example lane boundaries, that are required for the (transverse) guidance of the vehicle 100. This can be accomplished by optical detection of road or lane boundaries, for example. Subsequently, the events 404 and the elements 408 required for the (transverse) guidance of the vehicle 100 are selected, for example on the basis of a rules-based approach, and fused 412 in a road model. The (transverse) guidance of the vehicle then takes place on the basis of the fused road model, with different assistance systems (see 422, 424, 426 and others 428) also being able to resort to the fused road model.

Figure 5:
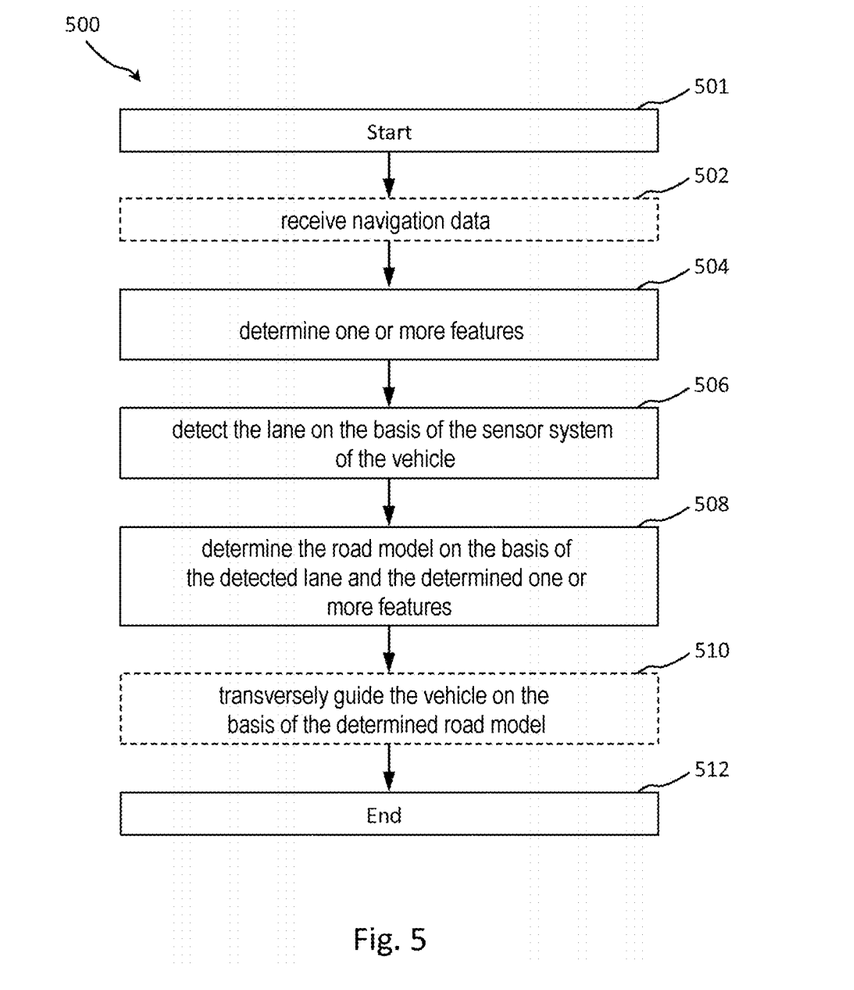
FIG. 5 shows a flowchart for a method according to embodiments of the present disclosure.

FIG. 5 shows a flowchart for a method 500 for detecting a lane 82 for transverse guidance of a vehicle 100 according to embodiments of the present disclosure. The method 500 begins in step 501. Optionally, navigation data are received in step 502. The received navigation data can, as described above, be based on map data (in particular ADAS data), and/or on other data sources (see above). In step 504, optionally at least sometimes on the basis of the received navigation data, one or more features 404 are determined. The determined one or more features 404 are suitable for influencing a detection of the lane 82, as described above. Exemplary features are areas of entrances, entries and exits, roadworks areas, junctions and the like (see above). The features may preferably be suitable for influencing the detection of the lane 82 insofar as the detection is hampered or prevented in the area of these features in particular by changed, changing or otherwise modified road markings 86, 88. This preferably includes partial hampering or prevention. In step 506, a lane 82 is detected on the basis of a sensor system 406 of the vehicle 100. In this step, it is possible to resort to a known detection of the lane, for example on the basis of one or more optical sensors (e.g. cameras). In step 508, the road model 412 is determined on the basis of the detected lane 82 and the determined one or more features 404. As described in detail, specifically detected road markings can be provided with a higher or lower weighting in this step in order to avoid or completely prevent the aforementioned disadvantages of possibly erroneous detection of the lane. Optionally, the vehicle 100 is transversely guided on the basis of the determined road model 412 in step 510. The method 500 ends in step 512.

Although the invention has been illustrated and explained more specifically in detail by preferred exemplary embodiments, the invention is not restricted by the disclosed examples and other variations can be derived therefrom by a person skilled in the art without departing from the scope of protection of the invention. It is clear, therefore, that a multiplicity of possible variations exist. It is also clear that embodiments mentioned by way of example are really only examples which should not be considered in any way as limiting the range of protection, the possible applications or the configuration of the invention, for example. Instead, the preceding description and the description of the figures enable a person skilled in the art to implement the illustrative embodiments in concrete form, a person skilled in the art, knowing the disclosed concept of the invention, being able to make various changes, for example with regard to the operation or the arrangement of individual elements mentioned in an illustrative embodiment, without departing from the range of protection defined by the claims and the legal equivalents thereof, such as, for instance, further explanations in the description.

What is claimed is:

1. A method for detecting a lane for transverse guidance of a vehicle, wherein the transverse guidance of the vehicle is based on a road model, the method comprising:
   determining one or more features, wherein
      the one or more features are suitable for influencing a detection of the lane;
   detecting a lane based on a sensor system of the vehicle;
   determining the road model based on the detected lane and the determined one or more features; and
   determining a weighting of one or more elements of the lane that are detected by the sensor system of the vehicle, wherein the road model is also determined based on the determined weighting.

2. The method according to claim 1, further comprising: receiving navigation data, wherein the one or more features are determined based on the navigation data.

3. The method according to claim 2, wherein the navigation data comprise one or more of:
   map data;
   data based on collective driving behavior of a multiplicity of vehicles; or
   data based on a detection of road signs.

4. The method according to claim 3, wherein
   the map data is Advanced Driver Assistance Systems data, and
   the data based on a detection of road signs is based on an optical detection of road signs.

5. The method according to claim 1, wherein
   if the one or more features indicate presence of a widening or narrowing on a road section being used by the vehicle, and the widening or narrowing relates to a lane that is beginning or ending, determining the road model comprises:
      weighting elements present on a side of the lane that is remote from the beginning or ending lane using a first factor; and
      weighting elements present on a side of the lane that faces the beginning or ending lane using a second factor; wherein
         the first factor indicates a higher weighting than the second factor.

6. The method according to claim 5, wherein
   the first and second factors are configured to optionally indicate a weighting in a range from 0% to 100%.

7. The method according to claim 6, wherein the first factor indicates a weighting of 100% and wherein the second factor indicates a weighting of 0%.

8. The method according to claim 1, further comprising: transversely guiding the vehicle based on the determined road model.

9. A method for detecting a lane for transverse guidance of a vehicle, wherein the transverse guidance of the vehicle is based on a road model, the method comprising:
   determining one or more features, wherein
      the one or more features are suitable for influencing a detection of the lane;
   detecting a lane based on a sensor system of the vehicle; and
   determining the road model based on the detected lane and the determined one or more features, wherein
      if the one or more features indicate presence of an entry or exit on a road section being used by the vehicle, determining the road model comprises:
         weighting elements present on a side of the lane that is remote from the entry or exit using a first factor; and
         weighting elements present on a side of the lane that faces the entry or exit using a second factor; wherein the first factor indicates a higher weighting than the second factor.

10. The method according to claim 9, wherein
   if the one or more features indicate presence of a widening or narrowing on a road section being used by the vehicle, and the widening or narrowing relates to a lane that is beginning or ending, determining the road model comprises:
      weighting elements present on a side of the lane that is remote from the beginning or ending lane using a first factor; and
      weighting elements present on a side of the lane that faces the beginning or ending lane using a second factor; wherein
         the first factor indicates a higher weighting than the second factor.

11. The method according to claim 9, wherein
   the first and second factors are configured to optionally indicate a weighting in a range from 0% to 100%.

12. The method according to claim 11, wherein the first factor indicates a weighting of 100% and wherein the second factor indicates a weighting of 0%.

13. A system for detecting a lane for transverse guidance of a vehicle, comprising:
   a control unit, wherein the control unit is configured to:
      determine one or more features, wherein the one or more features are suitable for influencing a detection of the lane;
      detect a lane based on a sensor system of the vehicle;
      determine a road model based on the detected lane and the determined one or more features; and
      determine a weighting of one or more elements of the lane that are detected by the sensor system of the vehicle, wherein the road model is also determined based on the determined weighting.

14. A vehicle comprising: the system according to claim 13, wherein the control unit is further configured to carry out:
   semiautonomous or autonomous control of the vehicle, and
   transverse guidance of the vehicle.

* * * * *